United States Patent
Dore et al.

(10) Patent No.: US 9,210,000 B2
(45) Date of Patent: Dec. 8, 2015

(54) CHANNEL ESTIMATING METHOD FOR FBMC TELECOMMUNICATION SYSTEM

(71) Applicant: COMMISSARIAT A L'ENERGIE ATOMIQUE ET AUX ENE ALT, Paris (FR)

(72) Inventors: Jean-Baptiste Dore, Saint Martin Le Vinoux (FR); Vincent Berg, Corenc (FR)

(73) Assignee: Commisariat ál'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/547,625

(22) Filed: Nov. 19, 2014

(65) Prior Publication Data

US 2015/0146770 A1 May 28, 2015

(30) Foreign Application Priority Data

Nov. 28, 2013 (FR) ..................................... 13 61790

(51) Int. Cl.
*H03H 7/40* (2006.01)
*H04L 25/02* (2006.01)
*H04L 25/03* (2006.01)
*H04L 27/26* (2006.01)

(52) U.S. Cl.
CPC ........ *H04L 25/0204* (2013.01); *H04L 25/0212* (2013.01); *H04L 25/0224* (2013.01); *H04L 25/03057* (2013.01); *H04L 27/264* (2013.01); *H04L 27/2647* (2013.01); *H04L 2025/03796* (2013.01)

(58) Field of Classification Search
CPC ............ H04L 27/2647; H04L 27/2613; H04L 25/03057; H04L 25/0232
USPC ......... 375/232, 148, 219, 227, 260, 316, 340; 370/329, 338

See application file for complete search history.

(56) References Cited

U.S. PATENT DOCUMENTS

| | | | |
|---|---|---|---|
| 2010/0040159 A1* | 2/2010 | Lee et al. | 375/260 |
| 2010/0124293 A1* | 5/2010 | Rajagopal | 375/260 |
| 2012/0243625 A1* | 9/2012 | Berg | 375/260 |

OTHER PUBLICATIONS

Behrouz Farhang-Boroujeny, "OFDM Versus Filter Bank Multicarrier" IEEE Signal Processing Magazine, 2011, pp. 92-112.
Botaro Hirosaki, "An Orthogonally Multiplexed QAM System Using the Discrete Fourier Transform" IEEE Transactions on Communications, vol. 29, No. 7, Jul. 1981, pp. 982-989.

(Continued)

*Primary Examiner* — Khai Tran
(74) *Attorney, Agent, or Firm* — Oblon, McClelland, Maier & Neustadt, L.L.P.

(57) ABSTRACT

The invention relates to a channel estimating method for an FBMC telecommunication system. The disclosed estimating method uses the signal before it is filtered by the analysis filter bank.
According to a first embodiment, the preamble is composed of a repetition in time of an elementary pattern of pilot symbols and the channel estimate is made in the stationary part of the preamble.
According to a second embodiment, the preamble is composed of a predetermined pattern of pilot symbols distributed in time and in frequency, and the channel estimate may be made on a typical part of the preamble.
The channel thus estimated is used to make an equalisation before the analysis filter bank.

11 Claims, 6 Drawing Sheets

(56) References Cited

OTHER PUBLICATIONS

Pierre Siohan, et al., "Analysis and Design of OFDM/OQAM Systems Based on Filterbank Theory" IEEE Transactions on Signal Processing, vol. 50, No. 5, May 2002, pp. 1170-1183.

M. Bellanger, et al., "FBMC physical layer: a primer" www.ict-phydyas.org, Jun. 2010, 31 pages.

Eleftherios Kofidis, et al., "Preamble-based Channel Estimation in OFDM/OQAM Systems: A Review" http://arxiv.org/abs/1303.2136v1, 2013, 37 pages.

French Preliminary Search Report issued Sep. 2, 2014 in French Application 13 61790, filed on Nov. 28, 2013 (with English translation of Categories of Cited Documents).

Maurice Bellanger et al. "OFDM and FBMC Transmission Techniques: a Compatible High Performance Proposal for Broadband Power Line Communications", Power Line Communications and its Applications (ISPLC), 2010, 6 pages.

Carlos Aurelio Faria Da Rocha et al. "Sub-Channel Equalizer Design Based on Geometric Interpolation for FBMC/OQAM Systems", Circuits and Systems (ISCAS), 2011, 4 pages.

C. Lele et al. "Channel estimation methods for preamble-based OFDM/OQAM modulations", XP-001517656, European Transactions on Telecommunications, vol. 19, No. 7, 2008, 10 pages.

Eleftherios Kofidis et al. "Preamble-based Channel Estimation in MIMO-OFDM/OQAM Systems", 2011 IEEE International Conference on Signal and Image Processing Applications (ICSIPA2011), 2011, 6 pages.

U.S. Appl. No. 14/533,480, filed Nov. 5, 2014, Mawlawi, et al.

U.S. Appl. No. 14/474,728, filed Sep. 2, 2014, Dore, et al.

\* cited by examiner

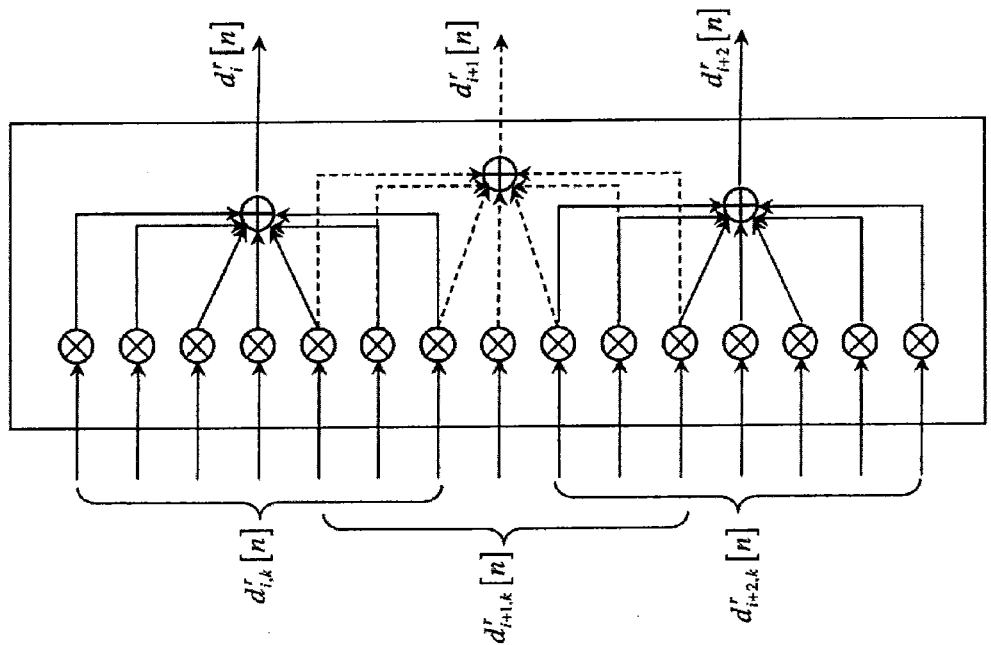
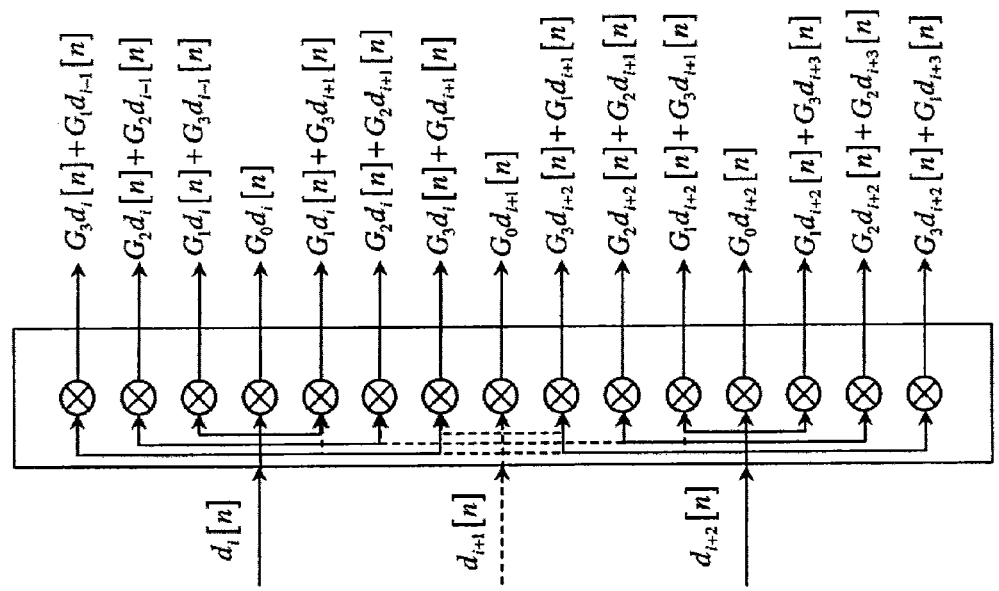

_US 9,210,000 B2_

CHANNEL ESTIMATING METHOD FOR FBMC TELECOMMUNICATION SYSTEM

TECHNICAL FIELD

This invention relates in general to the field of telecommunication systems using Filter Bank Multi-Carrier (FBMC) modulation systems.

STATE OF PRIOR ART

Telecommunication systems using a multi-carrier modulation are well known in the state in the art. The principle of such modulation consists of dividing the transmission band into a plurality of frequency sub-channels associated with sub-carriers and modulating each of these sub-carriers by the data to be transmitted.

The most widespread multi-carrier modulation is undoubtedly OFDM (Orthogonal Frequency Division Multiplexing). This is used in wireless LANs (WLAN, WiFi) in high speed wireless internet access (WiMAX), digital radio broadcasting systems (DVB-T, ISDB-T, DAB), asymmetric digital links (xDSL), the fourth generation of cell telephony (LTE), etc.

In an OFDM transmission system, each block of OFDM symbols is preceded by a guard interval or a cyclic prefix, with a length longer than the time spread of the channel impulse response so as to eliminate inter-symbol interference. However, inserting a guard interval or a prefix causes a loss of spectral efficiency. Finally, since spectral occupation of an OFDM signal is significantly higher than the sub-carrier band that it uses due to spreading of secondary lobes, OFDM modulation is not an optimum solution for applications requiring high out-of-band rejection rates.

FBMC (Filter Bank Multi Carrier) modulation can be used as an alternative to OFDM modulation.

A comparison between FBMC systems and OFDM systems is given in the article by B. Farhang-Bouroujeny entitled "OFDM versus filter bank multicarrier" published in IEEE Signal Processing Magazine, pp. 91-112, March 2011.

The principle of FBMC modulation is based on a filter bank synthesis in transmission and a filter bank analysis in reception.

FIG. 1 diagrammatically shows the structure of a first FBMC transmission/reception system according to the state of the art.

This structure was described in detail in the article by B. Hirosaki entitled "An orthogonally multiplexed QAM system using the discrete Fourier transform" published in IEEE Trans on Comm., vol. 29 No. 7, pp. 982-989, July 1981, and in the article by P. Siohan et al. entitled "Analysis and design of OFDM/OQAM systems based on filterbank theory" published in IEEE Trans. on signal processing, vol. 50, No 5, pp. 1170-1183, May 2002.

The QAM modulation symbols to be transmitted by the transmitter at a rate Nf where f=1/T, are grouped in blocks with size N, $x_0[n], \ldots, x_{N-1}[n]$, where n is the block time index. Each block of N symbols is supplied in parallel to N input channels to a preprocessing module 110, called OQAM (Offset QAM) preprocessing. This preprocessing module performs a OQAM type data modulation, in other words it demultiplexer the real part and the imaginary part of $x_k[n]$ in time at a rate of 2f.

The samples thus obtained are supplied in the form of blocks with size N to a synthesis filter bank 120, composed of an IFFT (inverse fast Fourier transform) module with size N, 130, a plurality N of polyphase filters 133, a plurality of oversamplers 135 with factor M=N/2 at the output from the different polyphase filters, and finally a plurality of delays 137 arranged in parallel and varying from 0 to N−1 sampling periods. Each of the N processing channels corresponds to one sub-channel.

Outputs from polyphase, oversampled and delayed filters are summated by the adder 139 before being transmitted on the channel 150.

The polyphase filters are frequency translated versions of k/MT of a prototype filter for which the impulse response duration is KT, in other words the output from a polyphase filter overlaps the output from the adjacent polyphase filter in time by M samples. The result is that an output from the polyphase filter overlaps K other polyphase filter outputs in time. The coefficient K is called the overlapping factor for this reason.

At the receiver end, the received signal is sampled at a rate Nf. The samples are supplied in the form of blocks with size N to an analysis filter bank 160, comprising a plurality of delays 163, arranged in parallel and varying from 0 to N−1 sampling periods, in the reverse order of the delays 137. Sampling flows derived from the different delays are then decimated by a factor M=N/2 by decimators 165 and then filtered by the analysis filters 167. The analysis filters have a conjugated impulse response inverted in time relative to the corresponding synthesis filter. Since the prototype filter has real values and is symmetric by time inversion, it can be shown that the impulse response of an analysis filter is the same as the corresponding synthesis filter. The combination of a synthesis filter with the corresponding analysis filter (product of transfer functions) gives a Nyquist filter.

An FFT (Fast Fourier Transform) with size N in 170 is then applied to symbols output from synthesis filters, the different frequency components of the FFT then being input into the postprocessing module 180 performing processing inverse to the preprocessing module 110.

Since synthesis/analysis filtering is done in the time domain at the output from the IFFT module and at the input to the FFT module respectively, the FBMC system shown in FIG. 1 will be said to be implemented in the time domain.

The FBMC system can be represented in the frequency domain as described in the document by M. Bellanger et al. entitled "FBMC physical layer: a primer" available on the www.ict-phydyas.org site.

FIG. 2 shows an implementation of the FBMC system in the frequency domain.

FIG. 2 shows the preprocessing module 210 performing an OQAM modulation of data to be transmitted.

Each data is then spread in frequency over an interval of 2K−1 adjacent sub-carriers centred on a sub-channel sub-carrier, each data being weighted by the real value taken by the synthesis filter transfer function at the corresponding frequency. In other words, each OQAM symbol $d_i[n]$ is spread on 2K−1 adjacent sub-carriers to give:

$$\check{d}_{i,k}[n] = d_i[n]G_k, k=-K+1, \ldots, 0, \ldots K-1 \qquad (1)$$

The frequency spreading and prototype filter module is denoted 220. It will be understood that this operation is equivalent to the filter operation using synthesis filters 133 in the time implementation.

Data with the same parity i and i+2 are spectrally separated and data with inverse parities i and i+1 overlap as shown in FIG. 3A. However, this overlap does not generate any interference because two data with inverse parities are necessarily on the real axis and on the imaginary axis respectively. For example, in FIG. 3A, data $d_i[n]$ and $d_{i+2}[n]$ are real values (shown in continuous lines), while data $d_{i+1}[n]$ is an imaginary value (shown in dashed lines).

An IFFT with size KN in 230 is then applied to the frequency spread and filtered data. Note that the size of the IFFT is stretched by a factor K relative to that in FIG. 1, in this case filtering by synthesis filters is done before the IFFT, in the frequency domain.

IFFT outputs are then combined in the combination module 240 as shown in FIG. 4. The set of samples at the output from the IFFT represents an FBMC symbol in the time domain, since the real part and the imaginary part of this symbol are offset by T/2. Since the duration of each FBMC symbol is KT and the symbols follow each other at frequency f=1/T, an FBMC symbol is combined in module 240 with the K/2 previous FBMC symbols and the next K/2 FBMC symbols. This is why K is once again called the overlapping factor.

Note that the combination operation in 240 is equivalent to the operation occurring within synthesis filters shown in FIG. 1.

The signal thus obtained is then translated into the RF band.

After transmission on channel 250, the received signal, demodulated in the base band, is sampled by the receiver at frequency Nf.

A sliding FFT (the FFT window sliding by KT between two FFT calculations) with size KN is done in the FFT module 260 on KN consecutive sample blocks.

The outputs from the FFT are then filtered and spectrally despread in the module 270. The despreading operation takes place in the frequency domain as shown in FIG. 3B. More precisely, the samples $\check{d}_{i,k}^r[n]$, $k=-K+1, \ldots, 0, \ldots K-1$ corresponding to 2K-1 frequencies $(i-1)K+1, \ldots iK, \ldots (i+1)K-1$ of the FFT are multiplied by the values of the analysis filter transfer function (translated in frequency from the prototype filter transfer function) at the frequencies in question and the results obtained as summated as follows:

$$d_i^r[n] = \sum_{k=-K+1}^{K-1} G_k \check{d}_{i,k}^r[n] \quad (2)$$

It should be noted that as in FIG. 3A, data with ranks of the same parity, for example $d_i^r[n]$ and $d_{i+2}^r[n]$ are obtained using disjoint sample blocks, while data in two consecutive ranks with inverse parities overlap. Thus, data $d_{i+1}^r[n]$ is obtained using samples $\check{d}_{i,k}^r[n]$, $k=1, \ldots, K-1$ and samples $\check{d}_{i+2,k}^r[n]$, $k=-K+1, \ldots, 1$.

Despreading of real data is shown in continuous lines while despreading of imaginary data is shown in dashed lines.

It should also be noted that in this case filtering by analysis filters is done in the frequency domain after the FFT, unlike the embodiment in FIG. 1.

The data $d_i^r[n]$ thus obtained are then input into a post-processing module 280, performing the inverse processing to that done in module 210, in other words an OQAM demodulation.

One of the problems to be solved in FBMC systems is to estimate the transmission channel. This channel estimate is necessary so that the signal can be equalised in reception and the transmitted message can be reproduced.

In OFDM systems, an equalisation called a sub-carrier coefficient equalisation is done, at least as long as the time spreading of the channel remains below the duration of the guard interval (or the prefix).

The channel estimate in an OFDM system usually requires the insertion of pilot symbols, in other words symbols known to the receiver, in a frame of OFDM symbols transmitted by the transmitter. These pilot symbols are distributed on different sub-carriers of the OFDM multiplex. The channel estimator can then determine the (complex) channel attenuation coefficient for each sub-carrier carrying a pilot symbol and, if necessary, deduce attenuation coefficients of the remaining sub-carriers by means of an interpolation in the frequency domain.

The channel estimate in the FBMC telecommunication systems uses similar techniques. The article by E. Kofidis et al entitled "Preamble-based channel estimation in OFDM/OQAM systems: a review", May 8, 2013, describes a review of different channel estimating methods in systems using FBMC modulation.

However, insertion of pilot symbols as in OFDM is impossible because time and frequency multiplexing in an FBMC frame does not guarantee that components are orthogonal in phase and in quadrature (in other words the real and imaginary parts of the received pilot symbols are not guaranteed as being orthogonal).

The following table contains the impulse response of an FBMC channel for an example prototype filter and an overlap factor K=4. The time index is denoted n and the sub-carrier index is denoted k.

| k/n | n − 2 | n − 1 | n | n + 1 | n + 2 |
|---|---|---|---|---|---|
| k − 1 | −0.125 | −0.206j | 0.239 | 0.206j | −0.125 |
| k | 0 | 0.564 | 1 | 0.564 | 0 |
| k + 1 | −0.125 | 0.206j | 0.239 | −0.206j | −0.125 |

It can thus be understood that a symbol at time n and on carrier k may generate interference in a neighbourhood in time and in frequency around position (n, k), this interface being real or imaginary depending on the position considered within this neighbourhood.

Thus, if a +1 pilot symbol is transmitted in position (n, k) and an imaginary data αj is transmitted in position (n, k−1), the following symbols are received:

| k/n | n − 2 | n − 1 | n | n + 1 | n + 2 |
|---|---|---|---|---|---|
| k − 1 | −0.125 | 0.564α − 0.206j | 0.239 + αj | 0.564α + 0.206j | −0.125 |
| k | −0.125 αj | 0.564 + 0.206j | 1 + 0.239αj | 0.564 − 0.206j | −0.125αj |
| k + 1 | −0.125 | 0.206j | 0.239 | −0.206j | −0.125 |

In this example, it can be understood that although the real part of the transmission channel coefficient $h_k^R$, can be retrieved, the same is not true for the imaginary part of this coefficient. Conversely, if the data adjacent to the symbol were real, it would have been possible to estimate the imaginary part of the transmission channel coefficient $h_k^I$, but not its real part.

To overcome this difficulty, it has been disclosed that surrounding data can be calculated so as to cancel the interference affecting the pilot symbol on reception (see the above-mentioned article by E. Kofidis). However, this introduces complexity on the side of the transmitter (complex calculation of the preamble) and increases the latency of the system. This preaccentuation can also cause locally high levels of the PAPR (Peak-to-Average Power Ratio) and therefore amplifier saturation problems.

Regardless of the receiver implementation (time or frequency), equalisation is usually done in the frequency domain after filtering by the prototype filter (in other words at the output from the FFT 170 module in FIG. 1 or module 270 in FIG. 2). The article by Bellanger mentioned above alternately discloses that equalisation can be done in the frequency domain before filtering by the prototype filter (in other words between the FFT module 260 and the filter 270 in FIG. 2). However, this document does not state how the channel can then be estimated. At this stage, the impulse response of the system is modified due to lack of filtering by the prototype filter and the channel estimate is not trivial.

The purpose of this invention is to disclose a channel estimating method for an FBMC telecommunication system that does not have the above-mentioned disadvantages, and particularly that does not require any preaccentuation at the transmitter and that is simple to implement.

PRESENTATION OF THE INVENTION

This invention is defined by a channel estimating method for an FBMC telecommunication system comprising a transmitter and a receiver, the transmitter being provided with a synthesis filter bank and the receiver being provided with an analysis filter bank, the analysis and synthesis filters being frequency shifted versions of a prototype filter, the signal transmitted by the transmitter comprising a preamble followed by data symbols, the preamble comprising pilot symbols distributed in time and in frequency on a plurality of sub-carriers, in which:

- an FFT is done on the signal received by the receiver, before the signal is filtered by the analysis filter bank;
- pilot symbols received during all or some of the preamble are extracted from the component blocks at the output from the FFT;
- channel coefficients are estimated for said plurality of sub-carriers by taking each sub-carrier and combining components for this sub-carrier and for successive blocks, using a plurality of predetermined weighting factors.

The preamble is advantageously composed of a repetition in time of the same pilot symbols distributed on said plurality of sub-carriers In particular, the pilot symbols may all be identical.

Preferably, at each transmission instant, one sub-carrier out of Q consecutive sub-carriers carries a pilot symbol, where Q is an integer greater than or equal to 2, the other sub-carriers carrying a null symbol.

In a first embodiment, the channel estimate is only made on the stationary part of the preamble, the weighting coefficients for one sub-carrier and successive blocks are identical and equal to $$\frac{1}{v\sigma_k},$$

where v is the number of successive blocks considered to estimate the channel coefficient for sub-carrier, and $\sigma_k$ depends on the impulse response of the prototype filter and the pilot symbols present in the time and frequency support of this filter.

In a second embodiment, the weighting factors ($\mu_{n,k}$) for one sub-carrier and for different blocks depend on the impulse response from the prototype filter, the size of the preamble, the pilot symbols present in the time and frequency support of the prototype filter and the type of data used in the frame.

The channel estimate for a sub-carrier is advantageously obtained as an MRC combination of estimates made from successive blocks obtained throughout the duration of the preamble.

Said weighting factors may be calculated iteratively, channel coefficients estimated from weighting factors obtained during one iteration being used to estimate data following the preamble during the next iteration and vice versa, the data thus estimated during one iteration being used to update said weighting factors during the next iteration.

Interpolation can be done in the frequency domain between channel coefficients to obtain a channel coefficient for a sub-carrier not carrying a pilot symbol.

The invention also relates to an equalisation method within an FBMC receiver, in which a channel estimate is made as mentioned above, using the pilot symbols distributed in time and in frequency within the preamble and in which a ZF or MMSE type equalisation is made on data symbols following the preamble, making use of channel coefficients estimated for said plurality of sub-carriers.

BRIEF DESCRIPTION OF THE DRAWINGS

Other characteristics and advantages of the invention will become clear after reading preferred embodiments of the invention with reference to the appended figures among which:

FIG. 3A shows spectral spreading made before the IFFT module in FIG. 2;

FIG. 3B shows spectral despreading done after the FFT module in FIG. 2;

DETAILED PRESENTATION OF PARTICULAR EMBODIMENTS

In the following, we will assume an FBMC telecommunication system comprising at least one transmitter and one receiver. For example, the transmitter may be a base station and the receiver may be a terminal (downlink) or the transmitter may be a terminal and the receiver may be a base station (uplink).

The signal transmitted by the transmitter comprises a preamble composed of pilot symbols followed by data symbols. Pilot symbols and data symbols are processed in an FBMC modulation as described in the introduction.

The basic idea of the invention is to perform equalisation before filtering by the prototype filter, choosing an appropriate preamble form and combining channel estimates obtained in successive reception instants within the preamble for each sub-carrier.

Figure 5:
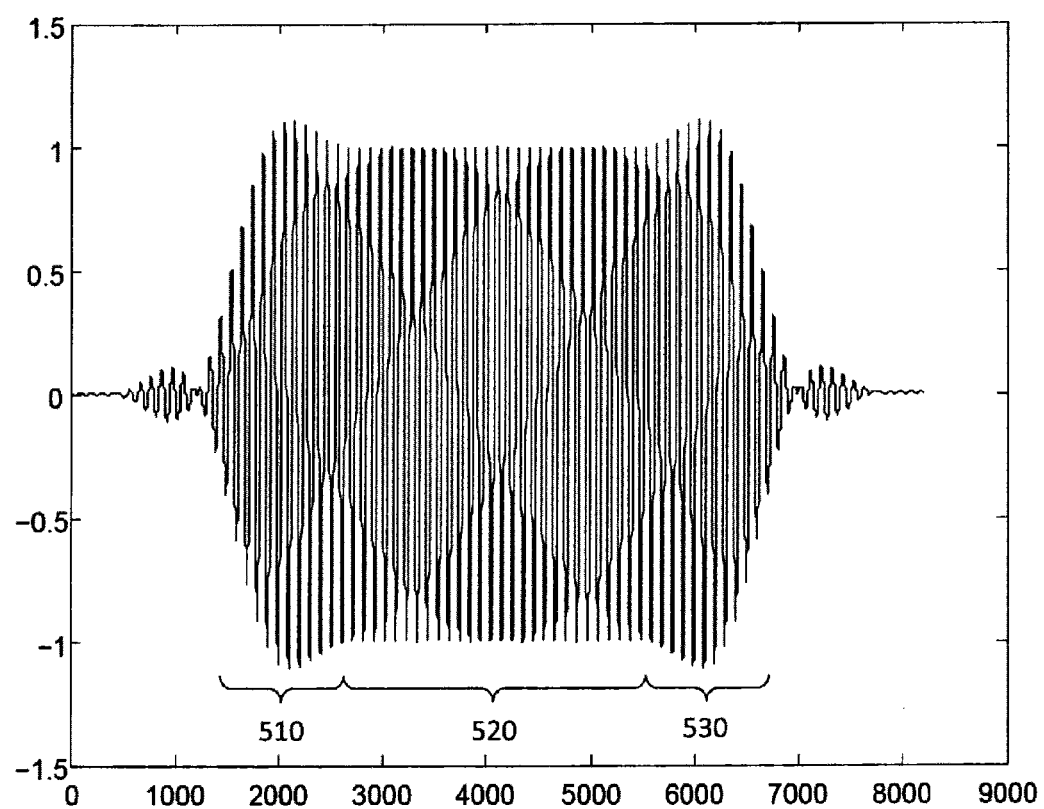
FIG. 5 shows an example of a signal at the output from an FBMC transmitter before RF conversion.

FIG. 5 shows the shape of a preamble transmitted by an FBMC transmitter before transposition into the RF band.

In this example, it is assumed that a pilot symbol is transmitted on one sub-carrier out of two, the other sub-carriers only being assigned null symbols. For a particular sub-carrier, successive pilot symbols within the preamble are identical. Thus in this case, one sub-carrier out of two transports the sequence of +1, +1, . . . , +1 pilot symbols and the other sub-carriers transports null sequences, throughout the entire duration of the preamble.

Three distinct zones are distinguished in the wave shape of the preamble: a first zone 510 at the beginning of the preamble corresponding to a transient regime with a duration equal to approximately the rise time of the prototype filter, a second zone 520 corresponding to a stationary regime in which the signal envelope is approximately constant, and a third zone 530 at the end of the preamble once again corresponding to a transient regime with a duration approximately equal to the fall time of the prototype filter.

The wave shape of the preamble in the first transient condition zone is usually not symmetric with the wave shape in the second transient condition zone. During the second transient zone, data that follow the preamble have an influence on the wave shape due to the time overlap of prototype filters.

In a first embodiment, it is assumed that a pattern of pilot symbols is transmitted and repeated throughout the entire duration of the preamble. In other words, the transmitter transmits the symbols block at each transmission instant n of the preamble:

$$x_0[n]=P_0; x_1[n]=P_1; \ldots ; x_{N-1}[n]=P_{N-1} \qquad (3)$$

the pilot symbols $P_0, \ldots, P_{N-1}$ being carried by the N sub-carriers respectively. Finally, the preamble can be represented by the following table in which, as before, the rows relate—to sub-carriers and the columns to transmission times:

| $P_0$ | $P_0$ | $P_0$ | $P_0$ | ... | $P_0$ | $P_0$ |
| $P_1$ | $P_1$ | $P_1$ | $P_1$ | ... | $P_1$ | $P_1$ |
| $P_2$ | $P_2$ | $P_2$ | $P_2$ | ... | $P_2$ | $P_2$ |
| . | . | . | . | ... | . | . |
| . | . | . | . | ... | . | . |
| . | . | . | . | ... | . | . |
| $P_{N-1}$ | $P_{N-1}$ | $P_{N-1}$ | $P_{N-1}$ | ... | $P_{N-1}$ | $P_{N-1}$ |

In one advantageous embodiment, it can be seen that one sub-carrier out of two will carry a pilot symbol (for example sub-carriers with even indexes) and that the other sub-carriers will carry null symbols. This variant may be adopted more generally, such that one sub-carrier out of Q (Q is integer greater than or equal to 2) consecutive sub-carriers will carry a pilot symbol, and the other sub-carriers will carry a zero symbol.

Regardless of the variant, the pilot symbols can be identical. Thus in the case of alternating pilot symbol/null symbol, the preamble will have the following structure:

| P | P | P | P | ... | P | P |
| 0 | 0 | 0 | 0 | ... | 0 | 0 |
| P | P | P | P | ... | P | P |
| 0 | 0 | 0 | 0 | ... | 0 | 0 |
| . | . | . | . | ... | . | . |
| . | . | . | . | ... | . | . |
| . | . | . | . | ... | . | . |
| P | P | P | P | ... | P | P |

In the first embodiment, the channel estimate is made from pilot symbols in the preamble in the stationary condition zone, in other words after the rise time of the prototype filter, the rise of the filter beginning at the beginning of the preamble and before the fall time of the prototype filter, the fall of the filter being complete at the end of the preamble.

It is assumed that the channel response does not vary throughout the duration of the preamble.

In this case, the FBMC signal at the channel output after translation into the base band and sampling but before filtering by the analysis filter bank can be written as follows, under stationary conditions:

$$r(n) = \sum_k h_k \left( \sum_{p;n-p \in I_t} \sum_{i;k-i \in I_f} P_i g_{n-p,k-i} \right) \qquad (4)$$

in which the time support and the frequency support of the impulse response of the prototype filter are denoted $I_t$ and $I_f$ respectively, n is the index of the time block and k is the index of the sub-carrier.

It can be seen that from (4) under stationary conditions, the symbol $r_k(n)$ received on a sub-carrier k is theoretically constant and is equal to:

$$r_k(n) = h_k \left( \sum_{q \in I_t} \sum_{i;k-i \in I_f} P_i g_{q,k-i} \right) = r_k \qquad (5)$$

The term between parentheses is known to the receiver because the pilot symbols are known by definition and the coefficients of the prototype filter are also known.

In practice, symbols transmitted on the different sub-carriers are not only affected by an attenuation coefficient (complex coefficient) but also by a noise that we will assume to be additive white Gaussian noise.

The channel estimate for sub-carrier k is then given by:

$$\langle h_k \rangle = \frac{1}{\nu \left( \sum_{q \in I_t} \sum_{i;k-i \in I_f} P_i g_{q,k-i} \right)} \sum_{n=n_0}^{n_0+\nu} r_k(n) \qquad (6)$$

where $\nu$ is the number of symbols considered under stationary conditions.

It should be noted that the sum in the denominator of expression (6) may be calculated once and for all from pilot symbols $P_0, \ldots, P_{N-1}$ and from the response of the prototype filter, for each sub-carrier. The expression (6) can then be written:

$$\langle h_k \rangle = \frac{1}{\nu \sigma_k} \sum_{n=n_0}^{n_0+\nu} r_k(n) \qquad (7)$$

where $$\sigma_k = \left( \sum_{q \in I_t} \sum_{i;k-i \in I_f} P_i g_{q,k-i} \right),$$

k=0, . . . , N−1 are the sums (complex) thus pre-calculated.

However, the first embodiment assumes that the preamble is sufficiently long so that a stationary condition can be set up. More precisely, for a prototype filter with duration KN, the duration of the preamble must be at least equal to (2K−1)N. This preamble duration may be a problem when data frames are short (high overhead/data ratio). In this case, it will be preferred to implement the second embodiment of the invention.

In the second embodiment, it is assumed that a preamble is transmitted composed of a predetermined pattern of pilot symbols. The pattern may be composed of a repetition in time of an elementary pattern as in the first embodiment. However, unlike the first embodiment, the constraint of constancy in time can be relaxed, in other words it is not necessary that pilot symbols carried by the same sub-carrier are identical.

In this case, the output signal from the transmission channel, after translation into the base band, can be written:

$$r(n) = \sum_{k} h_k \left( \sum_{p;n-p \in I_t} \sum_{i;k-i \in I_f} P_{p,i} g_{n-p,k-i} \right) \quad (8)$$

where $P_{p,i}$ is the pilot symbol carried by the sub-carrier with index p at transmission time i.

For each pilot symbol $P_{n,k}$ the signal to interference ratio at the receiver can be estimated as follows:

$$\lambda_{n,k} = \frac{|P_{n,k}|^2}{\left| \sum_{\substack{p \neq n \\ n-p \in I_t}} \sum_{\substack{i \neq k \\ k-i \in I_f}} P_{p,i} g_{n-p,k-i} \right|^2} \quad (9)$$

The channel estimate for sub-carrier k is thus obtained by making an MRC (Maximum Ratio Combining) combination of estimates at different reception times of the preamble, namely:

$$\langle h_k \rangle = \frac{1}{\sum_{n=n_0}^{n_0+\bar{v}} \lambda_{n,k}} \sum_{n=n_0}^{n_0+\bar{v}} \lambda_{n,k} \frac{r_k(n)}{\left( \sum_{p;n-p \in I_t} \sum_{i;k-i \in I_f} P_{p,i} g_{n-p,k-i} \right)} \quad (10)$$

where $\bar{v}$ is the number of reception instants considered in the preamble.

The reception times considered may be chosen here outside the stationary condition, particularly during the first transient zone 510 or during the second transient zone 530 in FIG. 5. However, if samples are taken into account in the second transient zone, data symbols appear in the sum in the denominator of the expression (9) and in the sum in the denominator of the expression (10), due to the overlap of the prototype filter support on the "data" part of the frame. Statistical processing is then necessary taking the average on different possible data symbols. It will be assumed in this respect that the probability density of OQAM symbols is equally distributed.

When the reception times considered are within the first transient condition zone or the stationary condition zone, the complex weighting coefficients used in the expression (10) may be calculated once and for all and stored in a look-up table at the receiver, namely:

$$\mu_{n,k} = \frac{\lambda_{n,k}}{\sum_{n=n_0}^{n_0+\bar{v}} \lambda_{n,k}} \frac{1}{\left( \sum_{p;n-p \in I_t} \sum_{i;k-i \in I_f} P_{p,i} g_{n-p,k-i} \right)} \quad (11)$$

The expression (10) can then more simply be reduced to:

$$\langle h_k \rangle = \sum_{n=n_0}^{n_0+\bar{v}} \mu_{n,k} r_k(n) \quad (12)$$

When some reception times used for the channel estimate are located in the second transient zone of the preamble, the coefficients $\mu_{n,k}$ can once again be precalculated but this time taking a statistical average on the data symbols appearing in the sum in the denominator of the expression (9) and in the sum in the denominator of the expression (11). More precisely, when a symbol $P_{p,i}$ appearing in this sum is actually a data symbol, the different possible OQAM symbols are envisaged with the same probability and the average value of $\mu_{n,k}$ is calculated.

More generally, the weighting coefficients $\mu_{n,k}$ can be determined by simulation taking account of the type of the prototype filter, the rise time (equal to the fall time) of the prototype filter, the size of the preamble and the data type used in the frame. Weighting coefficients are then stored in a look-up table at the receiver that is addressed by the above-mentioned parameters.

One variant of the second embodiment allows for making an iterative channel estimate. A first estimate of the coefficients is obtained during the first iteration, from the MRC weighting coefficients as explained above. During each of the successive iterations, these weighting coefficients are then updated by estimating data following the preamble, after these data have been equalised using channel coefficients estimated in the previous iteration. Thus, as the iterations continue, the channel estimate can refine the estimate of these data and therefore weighting coefficients. Conversely, the more precise estimate of data can be used to update weighting coefficients and refine the channel estimate. Iterations can be stopped when a convergence criterion is satisfied or after a predetermined number of iterations.

Figure 6:
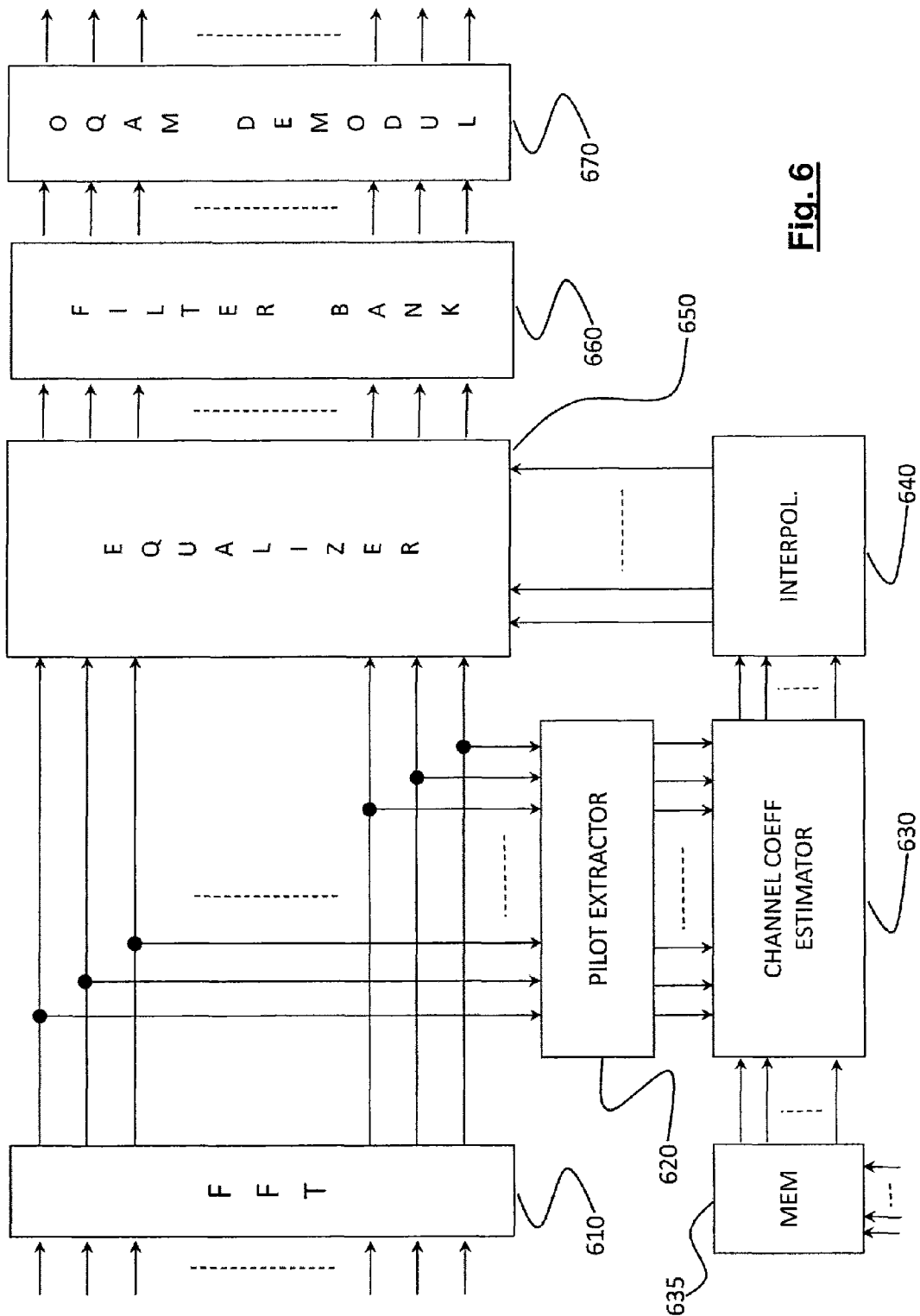
FIG. 6 diagrammatically shows an example of an FBMC receiver making use of a channel estimating method according to one embodiment of the invention.

FIG. 6 shows an example of an FBMC receiver using a channel estimating method according to one embodiment of the invention.

Figure 1:
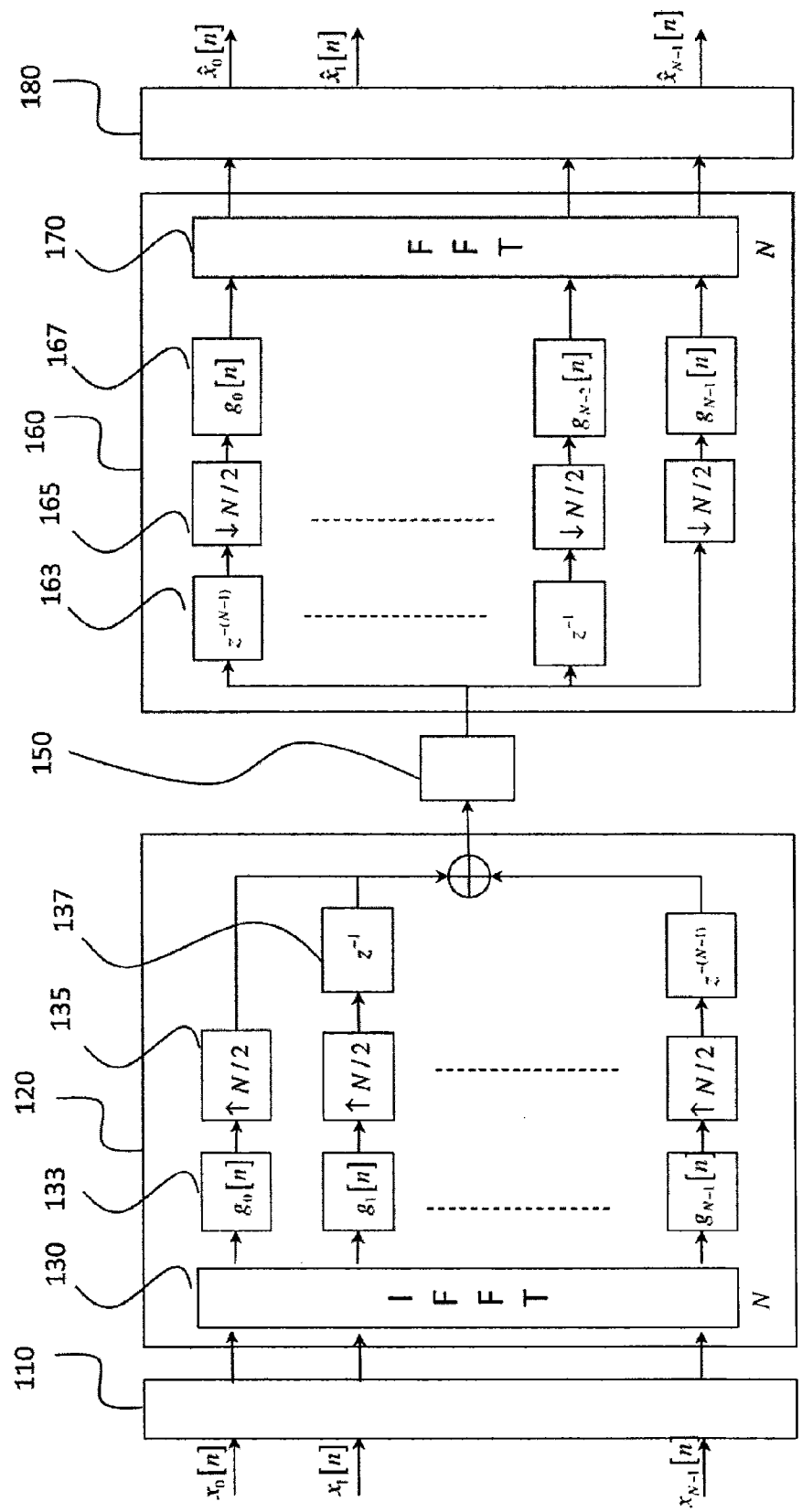
FIG. 1 shows a first implementation of an FBMC telecommunication system according to the state of the art.
Figure 2:
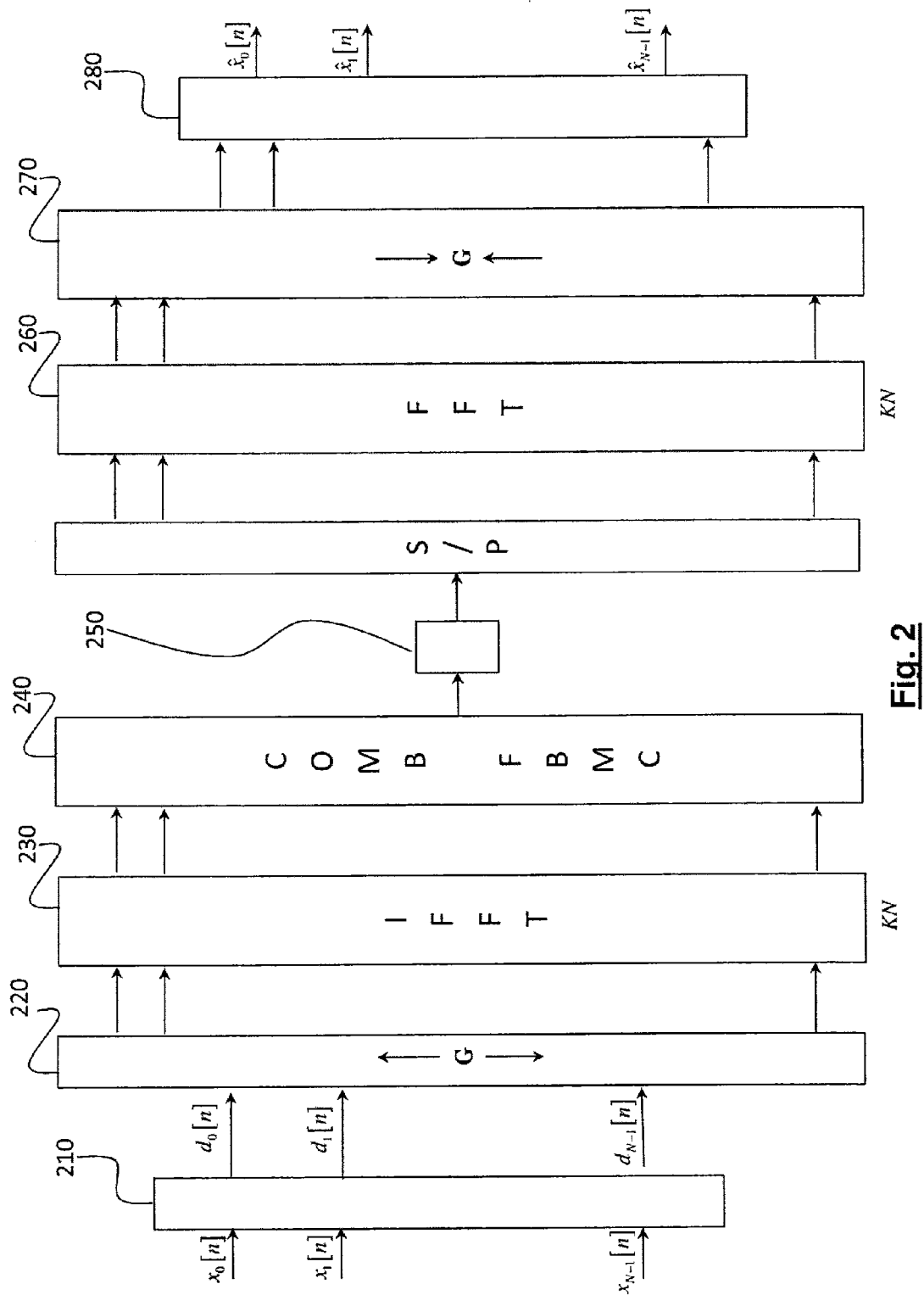
FIG. 2 shows a second implementation of an FBMC telecommunication system according to the state of the art.
Figure 4:
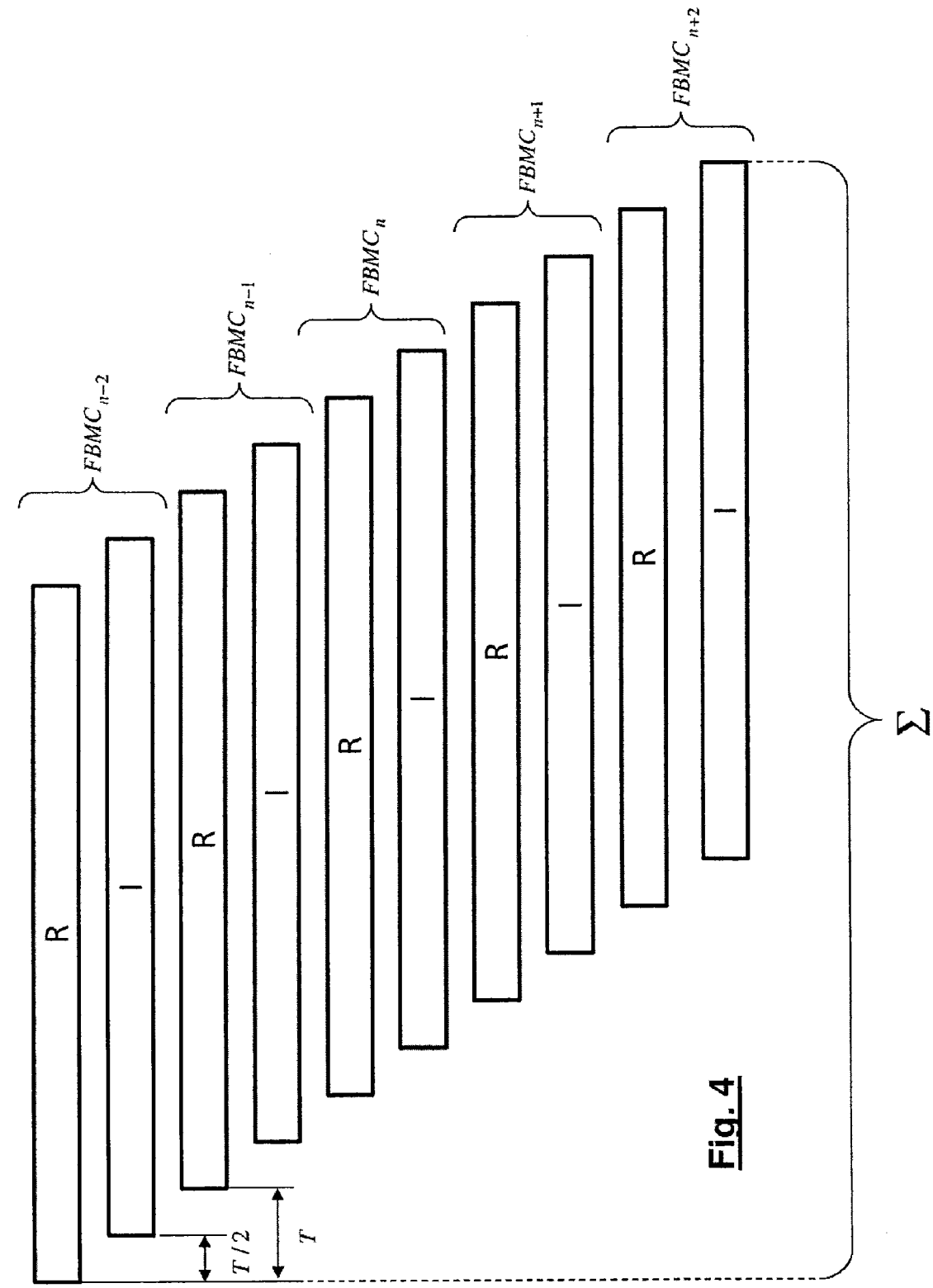
FIG. 4 shows the combination of FBMC symbols in FIG. 2.

The FBMC receiver shown uses a frequency implementation like that shown in FIG. 2.

The received signal is translated into the base band and is sampled at a rate Nf and submitted to an FFT size KN, in the FFT module 610.

The extraction module 620 extracts the pilot symbols received for each sample block at the output from the FFT.

In the first embodiment, pilot symbols are extracted during the stationary condition of the preamble, while in the second embodiment it can take place during all or some of the preamble, independently of the stationary or transient nature of the part considered.

The channel estimating module 630 makes a channel estimate using the expression (7) or (12) depending on the envisaged embodiment.

The complex coefficients $\sigma_k$ or $\mu_{n,k}$ are stored in a memory 635. If necessary, this memory can be addressed by parameters (filter length, preamble size, etc.) as explained above.

Channel coefficient estimates ($h_k$) for each sub-carrier k carrying a pilot symbol are supplied to the interpolation module 640. This module determines the missing channel coefficients by interpolation. Thus, when the channel coefficient is estimated for only one sub-carrier on Q, channel coefficients for the remaining sub-carriers can be estimated by interpolation.

Channel coefficients for all sub-carriers are then supplied to the equalisation module 650. This module does a ZF or MMSE equalisation of received symbols from the channel coefficients thus estimated. Note that a type ZF equalisation consists of multiplying the symbols on the different sub-carriers by coefficients $$\frac{1}{h_k},$$

k=0, ..., N−1, while an MMSE type equalisation consists of multiplying these same symbols by coefficients $$\frac{h_k^*}{|h_k|^2 + \sigma^2},$$

k=0, ..., N−1 where $\sigma^2$ is an estimate of the noise power on each sub-carrier (the noise power is assumed to be identical on the different sub-carriers).

After equalisation, the symbols are filtered in the frequency domain by an analysis filter bank 660 (copies of the prototype filter translated in frequency), and are then input to an OQAM demodulation module.

The channel estimating method according to the first or the second embodiment of the invention may also be applicable in the case of a time implementation of the FBMC receiver. In this case, equalisation is done in the time domain after filtering by the analysis filter bank.

The invention claimed is:

1. A channel estimating method for a Filter Bank Multi Carrier (FBMC) telecommunication system that includes a transmitter and a receiver, the transmitter being provided with a synthesis filter bank and the receiver being provided with an analysis filter bank, the analysis and synthesis filters being frequency shifted versions of a prototype filter, a signal transmitted by the transmitter including a preamble followed by data symbols, the preamble including pilot symbols distributed in time and in frequency on a plurality of sub-carriers, the channel estimating method comprising:
before the signal is filtered by the analysis filter bank:
performing a Fast Fourier Transform (FFT) on the signal received by the receiver;
extracting pilot symbols received during all or some of the preamble from component blocks at an output from the FFT; and
estimating channel coefficients for said plurality of sub-carriers by taking each respective sub-carrier and combining components for the respective sub-carrier and for successive blocks, using a plurality of predetermined weighting factors.

2. The channel estimating method according to claim 1, wherein the preamble is composed of a repetition in time of the same pilot symbols distributed on said plurality of sub-carriers.

3. The channel estimating method according to claim 2, wherein the pilot symbols are all identical.

4. The channel estimating method according to claim 2, wherein at each transmission instant, one sub-carrier out of Q consecutive sub-carriers carries a pilot symbol, where Q is an integer greater than or equal to 2, the other sub-carriers carrying a null symbol.

5. The channel estimating method according to claim 2, wherein the channel estimate is only made on a stationary part of the preamble, the weighting factors for one sub-carrier and successive blocks are identical and equal to $$\frac{1}{v\sigma_k},$$

where v is a number of successive blocks considered to estimate the channel coefficient for a sub-carrier, and $\sigma_k$ depends on an impulse response of the prototype filter and the pilot symbols present in the time and frequency support of this filter.

6. The channel estimating method according to claim 1, wherein the weighting factors ($\mu_{n,k}$) for one sub-carrier and for different blocks depend on an impulse response from the prototype filter, a size of the preamble, the pilot symbols present in the time and frequency support of a prototype filter and a type of data used in a frame.

7. The channel estimating method according to claim 1, wherein the channel estimate for a sub-carrier is a maximum ratio combining (MRC) combination of estimates made from successive blocks obtained throughout a duration of the preamble.

8. The channel estimating method according to claim 6, wherein said weighting factors are calculated iteratively, channel coefficients estimated from weighting factors obtained during one iteration are used to estimate data following the preamble during a next iteration and vice versa, data thus estimated during one iteration being used to update said weighting factors during a next iteration.

9. The channel estimating method according to claim 1, wherein an interpolation is done in the frequency domain between channel coefficients to obtain a channel coefficient for a sub-carrier not carrying a pilot symbol.

10. An equalization method within an FBMC receiver, wherein a channel estimate is made according to claim 1, using pilot symbols distributed in time and in frequency within the preamble and in which a zero forcing (ZF) or minimum mean square error (MMSE) type equalisation is made on data symbols following the preamble, making use of channel coefficients estimated for said plurality of sub-carriers.

11. A receiver configured to operate in a Filter Bank Multi Carrier (FBMC) telecommunication system that includes a transmitter and the receiver, the transmitter being provided with a synthesis filter bank and the receiver being provided with an analysis filter bank, the analysis and synthesis filters being frequency shifted versions of a prototype filter, a signal transmitted by the transmitter including a preamble followed by data symbols, the preamble including pilot symbols distributed in time and in frequency on a plurality of sub-carriers, the receiver comprising:
circuitry configured to, before the signal is filtered by the analysis filter bank,
perform a Fast Fourier Transform (FFT) on the signal received by the receiver;
extract pilot symbols received during all or some of the preamble from component blocks at an output from the FFT; and
estimate channel coefficients for said plurality of sub-carriers by taking each respective sub-carrier and combining components for the respective sub-carrier and for successive blocks, using a plurality of predetermined weighting factors,
wherein a channel estimate is made using pilot symbols distributed in time and in frequency within the preamble and in which a zero forcing (ZF) or minimum mean square error (MMSE) type equalisation is made on data symbols following the preamble, making use of channel coefficients estimated for said plurality of sub-carriers.

* * * * *